US012478888B2

(12) United States Patent
Cai

(10) Patent No.: US 12,478,888 B2
(45) Date of Patent: Nov. 25, 2025

(54) PROTECTIVE CASE ASSEMBLY FOR HANDHELD GAME CONSOLE

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 313 days.

(21) Appl. No.: 18/324,931

(22) Filed: May 26, 2023

(65) Prior Publication Data

US 2024/0149176 A1 May 9, 2024

(30) Foreign Application Priority Data

Nov. 7, 2022 (CN) ......................... 202222953944.3

(51) Int. Cl.
*A63F 13/98* (2014.01)

(52) U.S. Cl.
CPC .................................... *A63F 13/98* (2014.09)

(58) Field of Classification Search
None
See application file for complete search history.

(56) References Cited

U.S. PATENT DOCUMENTS 8,388,243 B1 * 3/2013 Smith .................. G03B 17/566 455/575.8
2003/0109314 A1 * 6/2003 Ku .......................... A63F 13/24 463/47
2003/0220145 A1 * 11/2003 Erickson ............... A63F 13/235 463/47
2005/0078441 A1 * 4/2005 Lin ......................... A63F 13/92 361/679.59
2007/0227923 A1 * 10/2007 Kidakarn ............... B65D 85/00 206/320
2010/0081505 A1 * 4/2010 Alten .................... G06F 1/1632 463/47
2010/0195279 A1 * 8/2010 Michael ................ G06F 1/1632 361/679.41
2011/0064401 A1 * 3/2011 Desorbo .............. H05K 5/0204 396/419
2011/0192857 A1 * 8/2011 Rothbaum ........... F16M 11/041 248/220.21

(Continued)

*Primary Examiner* — Tramar Harper

(74) *Attorney, Agent, or Firm* — HOWARD M COHN and Associates, LLC

(57) ABSTRACT

A protective case assembly for a handheld game console includes a bottom shell and an accessory. The bottom shell includes a supporting surface and a bottom side surface. The supporting surface is attached to a game console body of the handheld game console, and the supporting surface is configured to support the game console body of the handheld game console. The bottom side surface is disposed at a back portion of the supporting surface, and at least one fastener is disposed on the bottom side surface. A fitting portion is disposed on the accessory, the fitting portion is matched with the at least one fastener. The at least one fastener is connected to the fitting portion in a buckling manner. The handheld game console is enabled to be better protected, and the protective case assembly for the handheld game console is enabled to meet requirements of different application scenarios.

16 Claims, 4 Drawing Sheets

(56) References Cited

U.S. PATENT DOCUMENTS

| | | | | |
|---|---|---|---|---|
| 2013/0088813 | A1* | 4/2013 | Su | A45F 5/00 361/679.01 |
| 2013/0341214 | A1* | 12/2013 | King | A63F 13/98 206/216 |
| 2014/0187289 | A1* | 7/2014 | Cataldo | H04M 1/21 361/679.01 |
| 2014/0265762 | A1* | 9/2014 | Murphy | G06F 1/1626 312/223.1 |
| 2015/0133204 | A1* | 5/2015 | Ivanovski | H04B 1/3888 455/575.8 |
| 2017/0019512 | A1* | 1/2017 | Guerdrum | A45C 13/001 |
| 2018/0063306 | A1* | 3/2018 | Scannell, Jr. | H04M 1/04 |

* cited by examiner

PROTECTIVE CASE ASSEMBLY FOR HANDHELD GAME CONSOLE

TECHNICAL FIELD

The present disclosure relates to a technical field of handheld game consoles, and in particular to a protective case assembly for a handheld game console.

BACKGROUND

Handheld game consoles, further called potable game consoles, handheld game players, or portable game players, are greatly favored by consumers since the handheld game consoles are convenient for carrying and may provide entertainment for people in a short time, such as a process of waiting for cars, queuing, etc. Due to a fact that the handheld game consoles are large in size and are easy to be scratched in a carry-on process, protective cases fitting the handheld game consoles further appear on the market. However, current protective cases for the handheld game consoles generally have a single function of protecting the handheld game consoles, which cannot meet requirements of different application scenarios.

Therefore, how to provide a protective case for the handheld game consoles capable of protecting the handheld games consoles and further meeting the requirements of the different application scenarios is a problem to be solved by those who skilled in the art.

SUMMARY

In view of above, the present disclosure provides a protective case assembly for a handheld game console, in which a fastener is disposed on a side wall surface of the protective case assembly for the handheld game console, a fitting portion for matching with the fastener is disposed on an accessory, to slidably connect a bottom shell of the protective case assembly for the handheld game console to the accessory, thereby not only enabling the handheld game console to be better protected, but also enabling the protective case assembly for the handheld game console to meet requirements of different application scenarios.

The present disclosure provides a protective case assembly for a handheld game console, including a bottom shell and an accessory. The bottom shell includes a supporting surface and a bottom side surface. The supporting surface is attached to a game console body of the handheld game console, and the supporting surface is configured to support the game console body of the handheld game console. The bottom side surface is disposed at a back portion of the supporting surface, and at least one fastener is disposed on the bottom side surface. A fitting portion is disposed on the accessory, the fitting portion is matched with the at least one fastener. The at least one fastener is connected to the fitting portion in a buckling manner.

Furthermore, the protective case assembly for the handheld game console further includes a surface cover, the surface cover is snap-connected to the bottom shell.

Furthermore, the at least one fastener includes a fastener body and buckle tongues, the buckle tongues are disposed along an outer peripheral side of the fastener body, and the buckle tongues are fixedly connected to the fastener body.

Furthermore, the buckle tongues extend toward an outer portion of a surface of the outer peripheral side of the fastener body, and an included angle is formed between an extension direction of each of the buckle tongues and the surface of the outer peripheral side of the fastener body.

Furthermore, the at least one fastener is a racetrack-shaped fastener, the buckle tongues are disposed on a group of opposite side edges of the fastener body and are disposed on outer surfaces of the opposite side edges, where the outer surfaces of the opposite side edges face distal from each other.

Furthermore, the at least one fastener is a square fastener, the buckle tongues are disposed on at least one group of opposite side edges of the fastener body and are disposed on outer surfaces of the opposite side edges, where the outer surfaces of the opposite side edges face distal from each other.

Furthermore, the accessory is a supporting frame.

Furthermore, the accessory is a mobile power supply or a mobile hard disk.

Furthermore, the accessory is a docking station.

Furthermore, two fasteners are disposed on the bottom side surface, each of the two fasteners is connected to the accessory in the buckling manner.

Compared with the prior art, the protective case assembly for the handheld game console of the present disclosure has following beneficial effects.

According to the protective case assembly for the handheld game console of the present disclosure, the fastener is disposed on the side wall surface of the protective case assembly for the handheld game console, the fitting portion for matching with the fastener is disposed the accessory, so that the bottom shell of the protective case assembly for the handheld game console is connected to the accessory in the buckling manner, thereby not only enabling the handheld game console to be better protected, but also enabling the protective case assembly for the handheld game console to meet requirements of different application scenarios.

DETAILED DESCRIPTION

Figure 1:
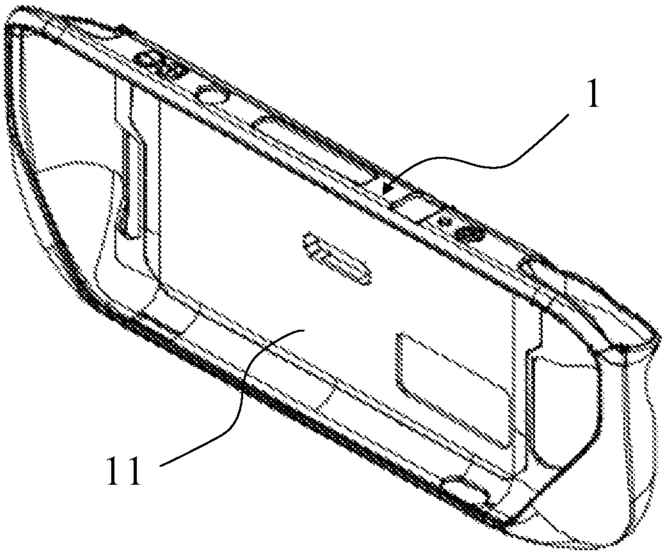
FIG. 1 is a structural schematic diagram of a front side of a protective case assembly for a handheld game console according to one embodiment of the present disclosure.
Figure 2:
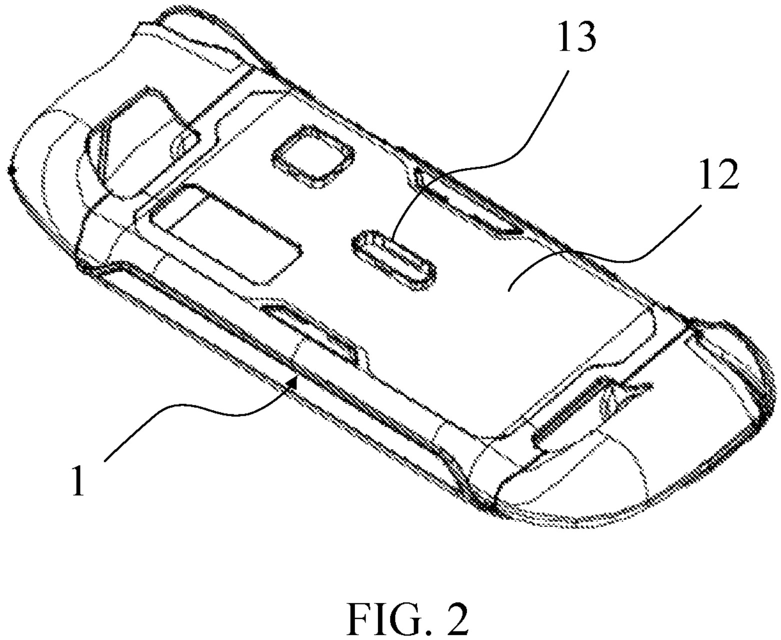
FIG. 2 is a structural schematic diagram of a rear side of the protective case assembly for the handheld game console according to one embodiment of the present disclosure.

In order to facilitate better understanding of objectives, structures, features, and effects of the present disclosure, the protective case assembly of the handheld gaming machine of the present disclosure is further described with reference to the accompanying drawings and specific embodiments.

As shown in FIGS. 1-6, the present disclosure provides a protective case assembly for a handheld game console, including a bottom shell 1 and an accessory 3. The bottom shell 1 includes a supporting surface 11 and a bottom side surface 12. The supporting surface 11 is attached to a game console body of the handheld game console, and the supporting surface 11 is configured to support the game console body of the handheld game console. The bottom side surface 12 is disposed at a back portion of the supporting surface 11, and at least one fastener 13 is disposed on the bottom side surface 12. A fitting portion 31 is disposed on the accessory 3, the fitting portion 31 is matched with the at least one fastener 13. The at least one fastener 13 is connected to the fitting portion 31 in a buckling manner.

In the embodiment, the supporting surface 11 is attached to the game console body of the handheld game console, and a shape of the supporting surface 11 is matched with a shape of the handheld game console, the bottom side surface 12 is disposed at a back portion of the supporting surface 11, and two fasteners 13 are disposed on the bottom side surface 12. Certainly, in other embodiments, a number of the fastener 13 may also be another number, such as one, three, four, etc., which is not limited thereto. The fasteners 13 may be uniformly distributed on the bottom side surface 12 according to specific application scenarios of the game console body of the handheld game console, and the fastener 13 is connected to the accessory 3 in the buckling manner. Specifically, the fitting portion 31 matching with the fastener 13 is disposed on the accessory 3, a shape of the fitting portion 31 is matched with a shape of the fastener 13. As an improvement, in the embodiment, the accessory 3 is capable of being pressed into the fastener 13 in a direction perpendicular to a plane of the bottom shell 1 of the protective case assembly of the handheld game console to be connected to the fastener 13 in the buckling manner. According to the protective case assembly for the handheld game console of the present disclosure, the fastener 13 is disposed on the side wall surface 12 of the protective case assembly for the handheld game console, the fitting portion 31 for matching with the fastener 13 is disposed the accessory 3, so that the bottom shell 1 of the protective case assembly for the handheld game console is connected to the accessory in the buckling manner, thereby not only enabling the handheld game console to be better protected, but also enabling the protective case assembly for the handheld game console to meet requirements of different application scenarios.

As shown in FIGS. 1-4, the protective case assembly for the handheld game console further includes a surface cover 2, the surface cover 2 is snap-connected to the bottom shell 1.

In the embodiment, the surface cover 2 and the bottom shell 1 are snap-connected, and when the handheld game console is not in use, the handheld game console may be fully wrapped in the surface cover 2 and the bottom shell 1 of the protective case assembly for the handheld game console, so that the game console is comprehensively protected.

As shown in FIGS. 2-6, the at least one fastener 13 includes a fastener body 131 and buckle tongues 132, the buckle tongues 132 are disposed along an outer peripheral side of the fastener body 131, and the buckle tongues 132 are fixedly connected to the fastener body 131. The buckle tongues 132 extend toward an outer portion of a surface of the outer peripheral side of the fastener body 131, and an included angle is formed between an extension direction of each of the buckle tongues 132 and the surface of the outer peripheral side of the fastener body 131. At least one first guide slope 1311 is provided between the group of opposite side edges of the fastener body 131 for engaging with the accessory. The buckle tongues 132 comprises at least one second guide slope 1321. The first guide slope 1311 prevents direct constraint on the deformation of the laterally extending body toward the opposing body, through an inclined transition design, the structure ensures resistance to fatigue failure in the laterally extending component while simultaneously mitigating assembly challenges associated with excessive structural rigidity. The second guide surface 1321 is designed to facilitate engagement with the accessory, enabling the fastener body 131 to move toward the opposing fastener body, thereby enhancing an ease of snap-fit assembly.

In the embodiment, the buckle tongues 132 are disposed along the outer peripheral side of the fastener body 131, and the buckle tongues 132 extend toward the outer portion of the surface of the outer peripheral side of the fastener body 131, meanwhile, the included angle is formed between an extension direction of each of the buckle tongues 132 and the surface of the outer peripheral side of the fastener body 131. As an improvement, in the embodiment, the included angle is ranged from 45 degrees to 90 degrees. Certainly, in other embodiments, the included angle may be ranged in other degrees, such as from 30 degrees to 45 degrees, or from 90 degrees to 110 degrees, which is not limited thereto. As an improvement, in the embodiment, the buckle tongues 132 and the fastener body 131 are integrally formed. Certainly, in other embodiments, the buckle tongues 132 and the fastener body 131 are separately formed, and are assembled into a whole after being formed, or, are assembled in other assembling manners, which are not limited thereto.

Figure 3:
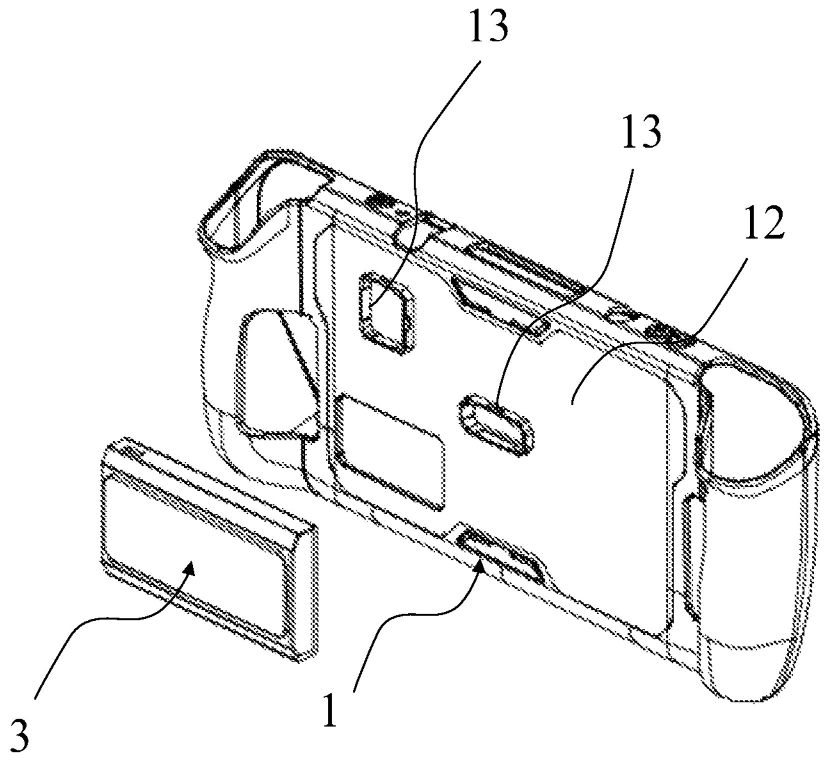
FIG. 3 is a structural schematic diagram of the protective case assembly for the handheld game console according to another embodiment of the present disclosure.
Figure 4:
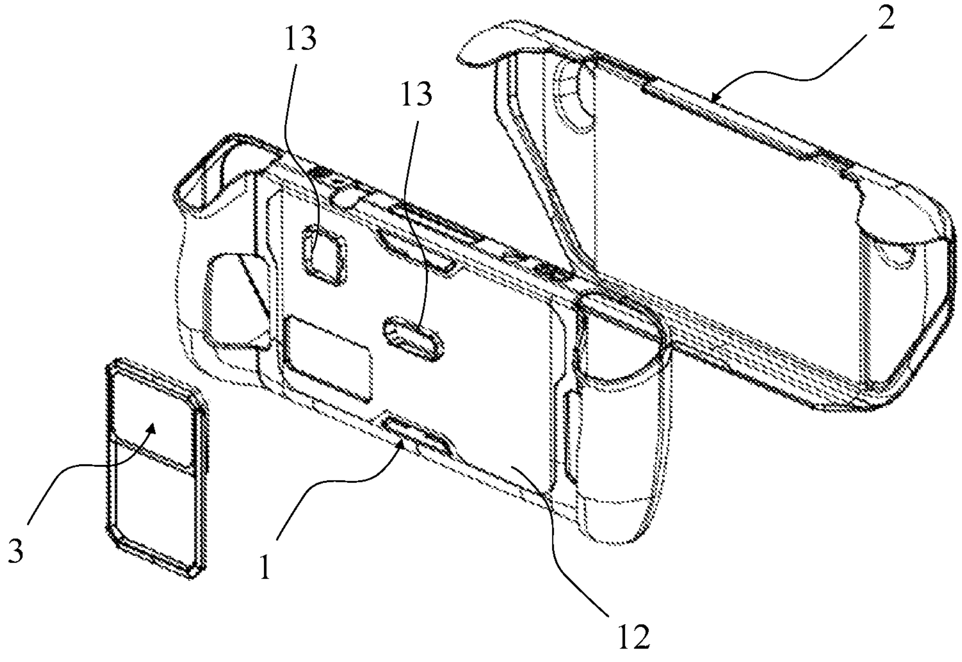
FIG. 4 is a structural schematic diagram of the protective case assembly for the handheld game console according to another embodiment of the present disclosure.
Figure 5:
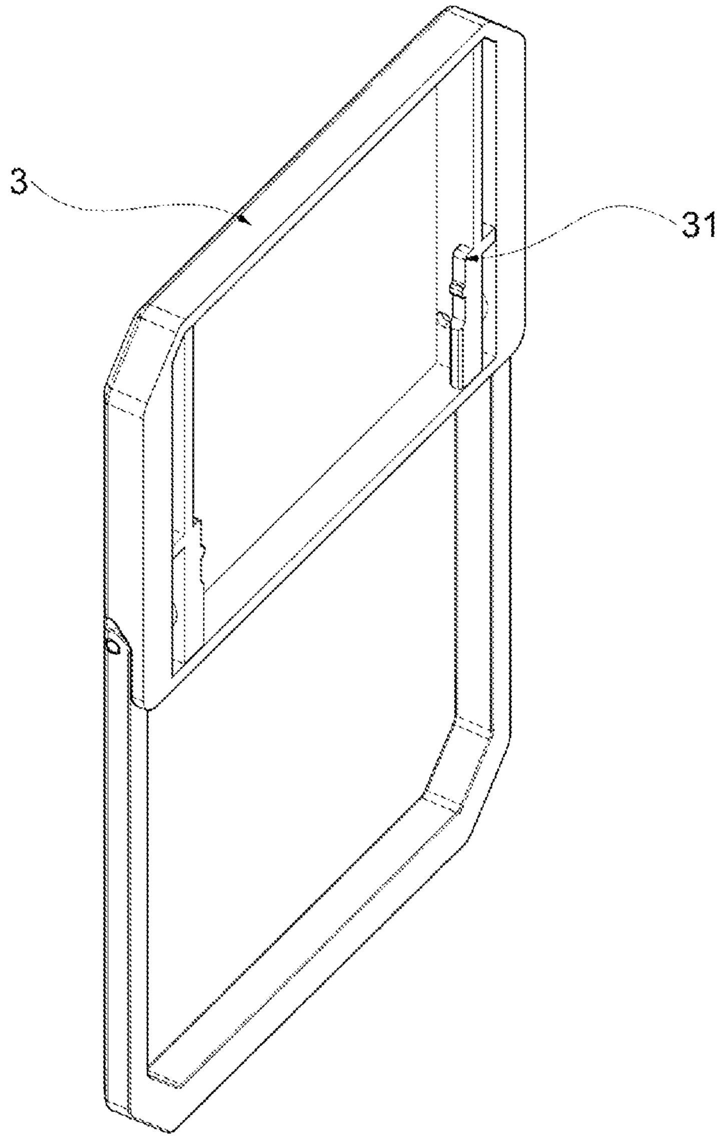
FIG. 5 is a structural schematic diagram of a supporting frame according to one embodiment of the present disclosure.
Figure 6:
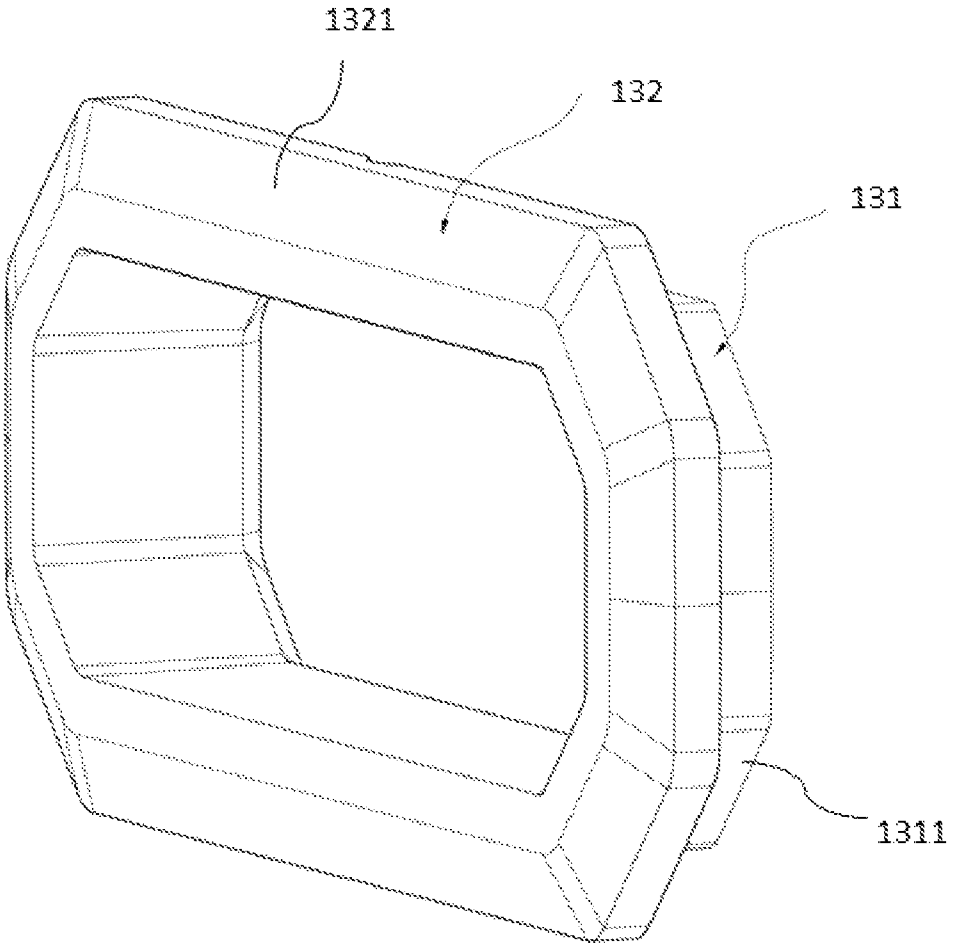
FIG. 6 is a structural schematic diagram of a fastener according to one embodiment of the present disclosure.

As shown in FIGS. 3 and 4, the two fasteners 13 are disposed on the bottom side surface 12, each of the two fasteners 13 is connected to the accessory 3 in the buckling manner.

A first one of the two fasteners 13 is a racetrack-shaped fastener, the buckle tongues 132 are disposed on a group of opposite side edges of the fastener body 131 and are disposed on outer surfaces of the opposite side edges, where the outer surfaces of the opposite side edges face distal from each other, namely that the buckle tongues 132 arranged on the pair of opposite side edges of the fastener body 131 extend in mutually opposite directions and away from each other.

In the embodiment, the first one of the two fasteners 13 is racetrack-shaped, on the one hand, the racetrack-shaped fastener is of an integrated structure, which effectively saves process steps of a production process, and on the other hand, by increasing contact areas between the fastener 14 and connecting components, the accessory 3 and the bottom shell 1 of the protective case assembly for the handheld game console are more stably and firmly connected.

A second one of the two fasteners 13 is square-shaped, the buckle tongues 132 are disposed on at least one group of opposite side edges of the fastener body 131 and are disposed on outer surfaces of the opposite side edges, where the outer surfaces of the opposite side edges face distal from each other.

In the embodiment, the second one of the two fasteners 13 is square-shaped, on the one hand, the square fastener is of an integrated structure, which effectively saves process steps of a production process, and on the other hand, by respectively disposing the buckle tongues 132 on outer side surfaces of two groups of the opposite side edges of the fastener body 131, a side edge of each side of the fastener body 131 is effectively connected to the accessory 3, so that the accessory 3 and the bottom shell 1 of the protective case assembly for the handheld game console are more stably and firmly connected.

As an improvement, the accessory 3 may be a supporting frame, a mobile power supply, a mobile hard disk, or a docking station, which is not limited thereto.

In view of above, the present disclosure provides the protective case assembly for the handheld game console, in which the fastener is disposed on the bottom side wall of the protective case assembly for the handheld game console, the fitting portion for matching with the fastener is disposed on the accessory, to connect the bottom shell of the protective case assembly for the handheld game console to the accessory in the buckling manner, thereby not only enabling the handheld game console to be better protected, but also enabling the protective case assembly for the handheld game console to meet requirements of different application scenarios.

Above detailed description is merely illustrative of the preferred embodiments of the present disclosure, and is not intended to limit the scope of the present disclosure, and therefore, any equivalent technical changes made using the present specification and drawings are all included within the scope of the present disclosure.

What is claimed is:

1. A protective case assembly for a handheld game console, comprising:

a bottom shell; and an accessory;

wherein the bottom shell comprises a supporting surface and a bottom side surface; the supporting surface is attached to a game console body of the handheld game console, and the supporting surface is configured to support the game console body of the handheld game console; the bottom side surface is disposed at a back portion of the supporting surface, and at least one fastener is disposed on the bottom side surface; a fitting portion is disposed on the accessory, the fitting portion is matched with the at least one fastener; the at least one fastener is connected to the fitting portion in a buckling manner; the at least one fastener comprises a fastener body and buckle tongues, the buckle tongues are disposed along an outer peripheral side of the fastener body, and the buckle tongues are fixedly connected to the fastener body, wherein the at least one fastener is of an annular shape, the buckle tongues are disposed on a group of opposite side edges of the fastener body and are disposed on outer surfaces of the opposite side edges and extending outward therefrom, where the outer surfaces of the opposite side edges face distal from each other.

2. The protective case assembly for the handheld game console according to claim 1, wherein the protective case assembly for the handheld game console further comprises a surface cover, the surface cover is snap-connected to the bottom shell.

3. The protective case assembly for the handheld game console according to claim 1, wherein the buckle tongues extend toward an outer portion of a surface of the outer peripheral side of the fastener body, and an included angle is formed between an extension direction of each of the buckle tongues and the surface of the outer peripheral side of the fastener body.

4. The protective case assembly for the handheld game console according to claim 3, wherein the included angle is ranged from 45 degrees to 90 degrees.

5. The protective case assembly for the handheld game console according to claim 3, wherein the included angle is ranged from 30 degrees to 45 degrees.

6. The protective case assembly for the handheld game console according to claim 3, wherein the included angle is ranged from 90 degrees to 110 degrees.

7. The protective case assembly for the handheld game console according to claim 1, wherein the at least one fastener is a racetrack-shaped fastener.

8. The protective case assembly for the handheld game console according to claim 1, wherein the at least one fastener is a square fastener.

9. The protective case assembly for the handheld game console according to claim 1, wherein the accessory is a supporting frame.

10. The protective case assembly for the handheld game console according to claim 1, wherein the accessory is a mobile power supply or a mobile hard disk.

11. The protective case assembly for the handheld game console according to claim 1, wherein the accessory is a docking station.

12. The protective case assembly for the handheld game console according to claim 1, wherein two fasteners are disposed on the bottom side surface, each of the two fasteners is connected to the accessory in the buckling manner.

13. The protective case assembly for the handheld game console according to claim 1, wherein the buckle tongues arranged on the pair of opposite side edges of the fastener body extend in mutually opposite directions and away from each other.

14. The protective case assembly for the handheld game console according to claim 1, wherein at least one first guide slope is provided between the group of opposite side edges of the fastener body for engaging with the accessory.

15. The protective case assembly for the handheld game console according to claim 1, wherein the buckle tongues each further comprises at least one second guide slope.

16. The protective case assembly for the handheld game console according to claim 1, wherein the pair of opposite side edges of the fastener body are spaced from each other.

* * * * *